(12) United States Patent
Huang et al.

(10) Patent No.: US 11,041,261 B2
(45) Date of Patent: Jun. 22, 2021

(54) GRAPHENE OXIDE/POLYPROPYLENE HEAT-RESISTANT HIGH-STRENGTH COMPOSITE PROFILE AND PREPARATION METHOD THEREOF

(71) Applicant: JIANGSU COLLEGE OF ENGINEERING AND TECHNOLOGY, Nantong (CN)

(72) Inventors: Xu Huang, Nantong (CN); Weidong Zhang, Nantong (CN); Zhihua Chen, Nantong (CN)

(73) Assignee: JIANGSU COLLEGE OF ENGINEERING AND TECHNOLOGY, Nantong (CN)

( * ) Notice: Subject to any disclaimer, the term of this patent is extended or adjusted under 35 U.S.C. 154(b) by 251 days.

(21) Appl. No.: 16/300,659

(22) PCT Filed: Oct. 31, 2017

(86) PCT No.: PCT/CN2017/108498
§ 371 (c)(1),
(2) Date: Nov. 12, 2018

(87) PCT Pub. No.: WO2018/161612
PCT Pub. Date: Sep. 13, 2018

(65) Prior Publication Data
US 2019/0284734 A1 Sep. 19, 2019

(30) Foreign Application Priority Data
Mar. 9, 2017 (CN) .......................... 201710138429.0

(51) Int. Cl.
| | |
|---|---|
| *D03D 15/513* | (2021.01) |
| *D03D 11/00* | (2006.01) |
| *D03D 23/00* | (2006.01) |
| *C08L 63/00* | (2006.01) |
| *C08J 5/24* | (2006.01) |
| *D03D 15/56* | (2021.01) |
| *B32B 27/12* | (2006.01) |
| *B32B 27/32* | (2006.01) |
| *B32B 27/02* | (2006.01) |
| *B32B 5/02* | (2006.01) |
| *D01F 8/06* | (2006.01) |
| *D01F 6/06* | (2006.01) |
| *D03D 15/283* | (2021.01) |
| *D03D 15/242* | (2021.01) |
| *D06M 15/55* | (2006.01) |

(52) U.S. Cl.
CPC ........... *D03D 15/513* (2021.01); *B32B 5/024* (2013.01); *B32B 27/02* (2013.01); *B32B 27/12* (2013.01); *B32B 27/32* (2013.01); *C08J 5/24* (2013.01); *C08L 63/00* (2013.01); *D01F 6/06* (2013.01); *D01F 8/06* (2013.01); *D03D 11/00* (2013.01); *D03D 15/242* (2021.01); *D03D 15/283* (2021.01); *D03D 15/56* (2021.01); *D03D 23/00* (2013.01); *C08J 2363/00* (2013.01); *C08J 2423/12* (2013.01); *C08L 2201/08* (2013.01); *C08L 2205/16* (2013.01); *D06M 15/55* (2013.01); *D10B 2101/12* (2013.01); *D10B 2321/022* (2013.01); *D10B 2403/032* (2013.01); *D10B 2505/02* (2013.01)

(58) Field of Classification Search
CPC ............ C08L 63/00–10; D03D 15/242; D03D 15/283; D03D 11/00; D01F 8/06; D01F 6/06; B32B 5/024; B32B 27/02; B32B 27/12; B32B 27/32
See application file for complete search history.

(56) References Cited

U.S. PATENT DOCUMENTS

2015/0344666 A1* 12/2015 Macosko ................ B32B 5/024
442/294

* cited by examiner

*Primary Examiner* — Kregg T Brooks
(74) *Attorney, Agent, or Firm* — CBM Patent Consulting, LLC

(57) ABSTRACT

A graphene oxide/polypropylene heat-resistant high-strength composite profile and a preparation method thereof. The composite profile is a graphene oxide/polypropylene-based reinforced plain weave composite resin material, which is a heat-resistant high-strength composite profile prepared from a graphene oxide/polypropylene-based woven plain weave fabric and a fiber heat-insulating material which are made into a layered spacing structure composite flat net, and a resin composite material. The preparation method comprises the following steps: preparation of a graphene oxide/polypropylene-based woven plain weave fabric; preparation of a graphene oxide/polypropylene-based reinforced plain weave composite material; preparation of a multilayer graphene oxide/polypropylene-based reinforced plain weave composite material; and preparation of a resin composite material. The present invention has the advantages of convenient operation and excellent properties.

2 Claims, No Drawings

GRAPHENE OXIDE/POLYPROPYLENE HEAT-RESISTANT HIGH-STRENGTH COMPOSITE PROFILE AND PREPARATION METHOD THEREOF

CROSS REFERENCES TO RELATED APPLICATIONS

This application is the U.S. national phase of International Application No. PCT/CN2017/108498 filed on 31 Oct. 2017 which designated the U.S. and claims priority to Chinese Application No. 201710138429.0 filed on 9 Mar. 2017, the entire contents of each of which are hereby incorporated by reference.

TECHNICAL FIELD

The present invention belongs to the field of composite profiles, and particularly relates to a graphene oxide/polypropylene heat-resistant high-strength composite profile and a preparation method thereof.

BACKGROUND ART

Since the day when graphene was discovered, it has become a research hotspot, and it has been widely used in fields such as supercapacitors, transparent electrodes, seawater desalination, solar cells, composite materials, etc. Graphene consists of carbon atoms forming a hexagonal honeycomb lattice by a sp2 hybrid orbital, has a structural unit of a carbon six-membered ring, and is a two-dimensional material with a single layer of carbon atom thickness. Graphene has excellent mechanical, electrical and thermal properties. Graphene oxide is a graphene derivative, which is substantially the same as a graphene structure. Graphene oxide contains functional groups such as hydroxyl —OH, carboxyl —COOH and carbonyl C=O, and can covalently react with other chemical groups.

Polypropylene fiber, referred to as polypropylene, has the characteristics of low melting point, chemical corrosion resistance, high heat distortion temperature, etc., and is a common base material for thermoplastic composite materials. The graphene oxide/polypropylene heat-resistant high-strength composite profile can overcome some defects of single polymers, give polymers special physicochemical properties, improve the comprehensive performance of polymers and broaden the application field of polymers, in order to obtain a polypropylene-based continuous fiber reinforced woven composite material with good forming effect.

SUMMARY OF THE INVENTION

Object of The Invention: The present invention provides a graphene oxide/polypropylene heat-resistant high-strength composite profile and a preparation method thereof.

Technical Solution: disclosed is a graphene oxide/polypropylene heat-resistant high-strength composite profile, wherein the composite profile is a graphene oxide/polypropylene-based reinforced plain weave composite resin material, which is a heat-resistant high-strength composite profile prepared from a graphene oxide/polypropylene-based woven plain weave fabric and a fiber heat-insulating material which are made into a layered spacing structure composite flat net, and a resin composite material, wherein the graphene oxide/polypropylene-based woven plain weave fabric adopts graphene oxide/polypropylene filament fiber, and the graphene oxide accounts for 0.3-0.7 wt % of the polypropylene filament fiber.

Disclosed is a preparation method of the graphene oxide/polypropylene heat-resistant high-strength composite profile, comprising the following steps:

step I. preparation of a graphene oxide/polypropylene-based woven plain weave fabric: the graphene oxide/polypropylene-based woven plain weave fabric adopts graphene oxide/polypropylene filament fiber (210D/24F), and the graphene oxide accounts for 0.3-0.7 wt % of the polypropylene fiber; through the weaving process of winding, doubling, throwing, shaping, warping, sizing, re-beaming, warp tying and weaving, a graphene oxide/polypropylene multifilament used as warp and weft yarns is weaved into a plain weave having a warp density of 45-55 pieces/5 cm, a weft density of 30-40 pieces/5 cm, a weight per square meter of 500-700 $g/m^2$ and a thickness of 0.06-0.20 mm;

step II. preparation of a graphene oxide/polypropylene-based reinforced plain weave composite material: a heat-insulating material is made into several flat nets having different thicknesses and densities, and a heat-insulating layer has a weight per square meter of 150-220 $g/m^2$ and a thickness of 0.10-0.25 mm; the graphene oxide/polypropylene-based woven plain weave fabric is placed thereon to prepare a non-woven net material by dry laying and needling; the heat-insulating layer material is one or more of asbestos, rock wool, glass fiber, aluminum silicate fiber, high silica fiber and alumina fiber;

step III. preparation of a multilayer graphene oxide/polypropylene-based reinforced plain weave composite material: the multilayer graphene oxide/polypropylene-based reinforced plain weave composite material has two or more layers, and the main purpose is to increase the content of graphene oxide/polypropylene in the composite material; through needling reinforcement, the graphene oxide/polypropylene-based reinforced plain weave composite material is reinforced by needling at front and back (twice), wherein the needling density is 90-130 needlings/$cm^2$, the needling frequency is 220-280 needlings/min, the primary needle density is 2500 needles/m, the secondary needle density is 2500 needles/m, and the fiber net needling speed is 1.8-2.0 m/min;

step IV. preparation of a resin composite material: the resin composite material is an epoxy resin: the epoxy resin and a curing agent are weighed according to a mass ratio of 2:1, and preheated at 45-60° C. for 10 min, a silane coupling agent with a mass fraction of 3-5% of the epoxy resin and a graphene oxide/N-methylpyrrolidone dispersion (0.5%) with a mass fraction of 3-5% of the epoxy resin are added, and the mixture is stirred for 10 min and vacuumed at 45-60° C. for 30-40 min to remove bubbles in the epoxy resin; an accelerator with a mass fraction of 1-2% of the epoxy resin and acetone are sequentially added into the epoxy resin and stirred and mixed uniformly, the multilayer graphene oxide/polypropylene-based reinforced plain weave composite material is immersed therein, a curing agent with a mass fraction of 40% of the epoxy resin is added, and the mixture is stirred uniformly and vacuumed at 45-60° C. for 30-40 min to remove bubbles; and the mixture is placed in a blast air oven at room temperature for 2 h, and cured at a temperature of 95° C.-120° C. for 4 h to finally obtain the graphene oxide/polypropylene heat-resistant high-strength composite profile.

Preferably, in step IV, the curing agent added is one or more of fatty amines, aromatics, aliphatic rings, modified amines, acid anhydrides, low-molecular polyamides and latent amine curing agents.

Preferably, in step IV, the silane coupling agent added is one or more of a silane coupling agent KH-560, a silane coupling agent A-172 and a composite aluminum titanium coupling agent.

Preferably, in step IV, the epoxy accelerator added is one or more of an epoxy accelerator XH-610, an epoxy accelerator DMP-30, BASF E-6623 and an epoxy curing accelerator EM-7604H.

Beneficial effects: the present invention has the following advantages:
1. Compared with the traditional polypropylene, the graphene oxide/polypropylene in the present invention has excellent effects of temperature resistance, heat transfer and high strength, and has higher impact resistance.
2. The graphene oxide/polypropylene in the present invention contains graphene oxide, and the graphene oxide on the fiber surface can be easily anchored with the epoxy resin, thereby enhancing the combination of the multilayer graphene oxide/polypropylene-based reinforced plain weave composite material with the resin.
3. The silane coupling agent and the graphene oxide/N-methylpyrrolidone dispersion are added to the epoxy resin to perform silane modification on the graphene oxide in the resin, thereby enhancing the anchoring of the silane modified graphene oxide and the multilayer graphene oxide/polypropylene-based reinforced plain weave composite material in the resin, and realizing an effect of synergistic double anchoring.

DETAILED DESCRIPTION OF THE INVENTION

The present invention will be described in detail below with reference to specific embodiments.

Specific Embodiment 1

Disclosed is a graphene oxide/polypropylene heat-resistant high-strength composite profile, wherein the composite profile is a graphene oxide/polypropylene-based reinforced plain weave composite resin material, which is a heat-resistant high-strength composite profile prepared from a graphene oxide/polypropylene-based woven plain weave fabric and a fiber heat-insulating material which are made into a layered spacing structure composite flat net, and a resin composite material, wherein the graphene oxide/polypropylene-based woven plain weave fabric adopts graphene oxide/polypropylene filament fiber, and the graphene oxide accounts for 0.3 wt % of the polypropylene filament fiber.

Disclosed is a preparation method of the graphene oxide/polypropylene heat-resistant high-strength composite profile, comprising the following steps:

step I. preparation of a graphene oxide/polypropylene-based woven plain weave fabric: the graphene oxide/polypropylene-based woven plain weave fabric adopts graphene oxide/polypropylene filament fiber (210D/24F), and the graphene oxide accounts for 0.3 wt % of the polypropylene fiber; and through the weaving process of winding, doubling, throwing, shaping, warping, sizing, re-beaming, warp tying and weaving, a graphene oxide/polypropylene multifilament used as warp and weft yarns is weaved into a plain weave having a warp density of 45 pieces/5 cm, a weft density of 30 pieces/5 cm, a weight per square meter of 500 g/m$^2$ and a thickness of 0.06 mm.

step II. preparation of a graphene oxide/polypropylene-based reinforced plain weave composite material: a heat-insulating material is made into several flat nets having different thicknesses and densities, and a heat-insulating layer has a weight per square meter of 150 g/m$^2$ and a thickness of 0.10 mm; the graphene oxide/polypropylene-based woven plain weave fabric is provided thereon to prepare a non-woven net material by dry laying and needle punching; and the heat-insulating layer material is one or more of asbestos, rock wool, glass fiber, aluminum silicate fiber, high silica fiber and alumina fiber.

step III. preparation of a multilayer graphene oxide/polypropylene-based reinforced plain weave composite material: the multilayer graphene oxide/polypropylene-based reinforced plain weave composite material has two or more layers, and the main purpose is to increase the content of graphene oxide/polypropylene in the composite material; and through needling reinforcement, the graphene oxide/polypropylene-based reinforced plain weave composite material is reinforced by needling at front and back (twice), wherein the needling density is 90 needlings/cm$^2$, the needling frequency is 220 needlings/min, the primary needle density is 2500 needles/m, the secondary needle density is 2500 needles/m, and the fiber net needling speed is 1.8 m/min.

step IV. preparation of a resin composite material: the resin composite material is an epoxy resin: the epoxy resin and a curing agent are weighed according to a mass ratio of 2:1, and preheated at 45° C. for 10 min, a silane coupling agent with a mass fraction of 3% of the epoxy resin and a graphene oxide/N-methylpyrrolidone dispersion (0.5%) with a mass fraction of 3% of the epoxy resin are added, and the mixture is stirred for 10 min and vacuumed at 45° C. for 30 min to remove bubbles in the epoxy resin; an accelerator with a mass fraction of 1% of the epoxy resin and acetone are sequentially added into the epoxy resin and stirred and mixed uniformly, the multilayer graphene oxide/polypropylene-based reinforced plain weave composite material is immersed therein, a curing agent with a mass fraction of 40% of the epoxy resin is added, and the mixture is stirred uniformly and vacuumed at 45° C. for 30 min to remove bubbles; and the mixture is placed in a blast air oven at room temperature for 2 h, and cured at a temperature of 95° C. for 4 h to finally obtain the graphene oxide/polypropylene heat-resistant high-strength composite profile; the curing agent added being one or more of fatty amines, aromatics, aliphatic rings, modified amines, acid anhydrides, low-molecular polyamides and latent amine curing agents; the silane coupling agent added being one or more of a silane coupling agent KH-560, a silane coupling agent A-172 and a composite aluminum titanium coupling agent; the epoxy accelerator added being one or more of an epoxy accelerator XH-610, an epoxy accelerator DMP-30, BASF E-6623 and an epoxy curing accelerator EM-7604H.

Specific Embodiment 2

Disclosed is a graphene oxide/polypropylene heat-resistant high-strength composite profile, wherein the composite profile is a graphene oxide/polypropylene-based reinforced plain weave composite resin material, which is a heat-resistant high-strength composite profile prepared from a graphene oxide/polypropylene-based woven plain weave fabric and a fiber heat-insulating material which are made into a layered spacing structure composite flat net, and a resin composite material, wherein the graphene oxide/polypropylene-based woven plain weave fabric adopts graphene oxide/polypropylene filament fiber, and the graphene oxide accounts for 0.7 wt % of the polypropylene filament fiber.

Disclosed is a preparation method of the graphene oxide/polypropylene heat-resistant high-strength composite profile, comprising the following steps:

step I. preparation of a graphene oxide/polypropylene-based woven plain weave fabric: the graphene oxide/polypropylene-based woven plain weave fabric adopts graphene oxide/polypropylene filament fiber (210D/24F), and the graphene oxide accounts for 0.7 wt % of the polypropylene fiber; and through the weaving process of winding, doubling, throwing, shaping, warping, sizing, re-beaming, warp tying and weaving, a graphene oxide/polypropylene multifilament used as warp and weft yarns is to weaved into a plain weave having a warp density of 55/5 cm, a weft density of 40/5 cm, a weight per square meter of 700 g/m$^2$ and a thickness of 0.20 mm.

step II. preparation of a graphene oxide/polypropylene-based reinforced plain weave composite material: a heat-insulating material is made into several flat nets having different thicknesses and densities, and a heat-insulating layer has a weight per square meter of 220 g/m$^2$ and a thickness of 0.25 mm; the graphene oxide/polypropylene-based woven plain weave fabric is provided thereon to prepare a non-woven net material by dry laying and needle punching; and the heat-insulating layer material is one or more of asbestos, rock wool, glass fiber, aluminum silicate fiber, high silica fiber and alumina fiber.

step III. preparation of a multilayer graphene oxide/polypropylene-based reinforced plain weave composite material: the multilayer graphene oxide/polypropylene-based reinforced plain weave composite material has two or more layers, and the main purpose is to increase the content of graphene oxide/polypropylene in the composite material; and through needling reinforcement, the graphene oxide/polypropylene-based reinforced plain weave composite material is reinforced by needling at front and back (twice), wherein the needling density is 130 needlings/cm$^2$, the needling frequency is 280 needlings/min, the primary needle density is 2500 needles/m, the secondary needle density is 2500 needles/m, and the fiber net needle punching speed is 2.0 m/min.

step IV. preparation of a resin composite material: the resin composite material is an epoxy resin: the epoxy resin and a curing agent are weighed according to a mass ratio of 2:1, and preheated at 60° C. for 10 min, a silane coupling agent with a mass fraction of 3-5% of the epoxy resin and a graphene oxide/N-methylpyrrolidone dispersion (0.5%) with a mass fraction of 5% of the epoxy resin are added, and the mixture is stirred for 10 min and vacuumed at 45-60° C. for 40 min to remove bubbles in the epoxy resin; an accelerator with a mass fraction of 2% of the epoxy resin and acetone are sequentially added into the epoxy resin and stirred and mixed uniformly, the multilayer graphene oxide/polypropylene-based reinforced plain weave composite material is immersed therein, a curing agent with a mass fraction of 40% of the epoxy resin is added, and the mixture is stirred uniformly and vacuumed at 60° C. for 40 min to remove bubbles; and the mixture is placed in a blast air oven at room temperature for 2 h, and cured at a temperature of 120° C. for 4 h to finally obtain the graphene oxide/polypropylene heat-resistant high-strength composite profile; the curing agent added being one or more of fatty amines, aromatics, aliphatic rings, modified amines, acid anhydrides, low-molecular polyamides and latent amine curing agents; the silane coupling agent added being one or more of a silane coupling agent KH-560, a silane coupling agent A-172 and a composite aluminum titanium coupling agent; the epoxy accelerator added being one or more of an epoxy accelerator XH-610, an epoxy accelerator DMP-30, BASF E-6623 and an epoxy curing accelerator EM-7604H.

Specific Embodiment 3

Disclosed is a graphene oxide/polypropylene heat-resistant high-strength composite profile, wherein the composite profile is a graphene oxide/polypropylene-based reinforced plain weave composite resin material, which is a heat-resistant high-strength composite profile prepared from a graphene oxide/polypropylene-based woven plain weave fabric and a fiber heat-insulating material which are made into a layered spacing structure composite flat net, and a resin composite material, wherein the graphene oxide/polypropylene-based woven plain weave fabric adopts graphene oxide/polypropylene filament fiber, and the graphene oxide accounts for 0.4 wt % of the polypropylene filament fiber.

Disclosed is a preparation method of the graphene oxide/polypropylene heat-resistant high-strength composite profile, comprising the following steps:

step I. preparation of a graphene oxide/polypropylene-based woven plain weave fabric: the graphene oxide/polypropylene-based woven plain weave fabric adopts graphene oxide/polypropylene filament fiber (210D/24F), and the graphene oxide accounts for 0.4 wt % of the polypropylene fiber; and through the weaving process of winding, doubling, throwing, shaping, warping, sizing, re-beaming, warp tying and weaving, a graphene oxide/polypropylene multifilament used as warp and weft yarns is weaved into a plain weave having a warp density of 49/5 cm, a weft density of 36/5 cm, a weight per square meter of 600 g/m$^2$ and a thickness of 0.10 mm step II. preparation of a graphene oxide/polypropylene-based reinforced plain weave composite material: a heat-insulating material is made into several flat nets having different thicknesses and densities, and a heat-insulating layer has a weight per square meter of 190 g/m$^2$ and a thickness of 0.20 mm; the graphene oxide/polypropylene-based woven plain weave fabric is coated thereon to prepare a non-woven net material by dry laying and needle punching; and the heat-insulating layer material is one or more of asbestos, rock wool, glass fiber, aluminum silicate fiber, high silica fiber and alumina fiber.

step III. preparation of a multilayer graphene oxide/polypropylene-based reinforced plain weave composite material: the multilayer graphene oxide/polypropylene-based reinforced plain weave composite material has two or more layers, and the main purpose is to increase the content of graphene oxide/polypropylene in the composite material; and through needling reinforcement, the graphene oxide/polypropylene-based reinforced plain weave composite material is reinforced by needling at front and back (twice), wherein the punch density is 110 needling s/cm$^2$, the needling frequency is 270 needlings/min, the primary needle density is 2500 needles/m, the secondary needle density is 2500 needles/m, and the fiber net needling speed is 1.9 m/min.

step IV. preparation of a resin composite material: the resin composite material is an epoxy resin: the epoxy resin and a curing agent are weighed according to a mass ratio of 2:1, and preheated at 52° C. for 10 min, a silane coupling agent with a mass fraction of 4% of the epoxy resin and a graphene oxide/N-methylpyrrolidone dispersion (0.5%) with a mass fraction of 4% of the epoxy resin are added, and the mixture is stirred for 10 min and vacuumed at 52° C. for 36 min to remove bubbles in the epoxy resin; an accelerator with a mass fraction of 1.5% of the epoxy resin and acetone are sequentially added into the epoxy resin and stirred and mixed uniformly, the multilayer graphene oxide/polypropylene-based reinforced plain weave composite material is immersed therein, a curing agent with a mass fraction of 40% of the epoxy resin is added, and the mixture is stirred uniformly and vacuumed at 54° C. for 37 min to remove bubbles; and the mixture is placed in a blast air oven at room temperature for 2 h, and cured at a temperature of 110° C. for 4 h to finally obtain the graphene oxide/polypropylene heat-resistant high-strength composite profile; the curing agent added being one or more of fatty amines, aromatics, aliphatic rings, modified amines, acid anhydrides, low-molecular polyamides and latent amine curing agents; the silane coupling agent added being one or more of a silane coupling agent KH-560, a silane coupling agent A-172 and a composite aluminum titanium coupling agent; the epoxy accelerator added being one or more of an epoxy accelerator XH-610, an epoxy accelerator DMP-30, BASF E-6623 and an epoxy curing accelerator EM-7604H.

The present invention is not limited to the above-described preferred embodiments, and any other forms of products can be derived by anyone with the teaching of the present invention. However, any technical solutions that are the same as or similar to the present application, regardless of its changes on shape or structure, shall fall within the scope of the present invention.

What is claimed is:

1. A preparation method of a graphene oxide/polypropylene heat-resistant high-strength composite profile, characterized by comprising the following steps:
    step I. preparation of a graphene oxide/polypropylene-based woven plain weave fabric: the graphene oxide/polypropylene-based woven plain weave fabric adopts graphene oxide/polypropylene filament fiber (210D/24F), and the graphene oxide accounts for 0.3-0.7 wt % of the polypropylene fiber; through the weaving process of winding, doubling, throwing, shaping, warping, sizing, re-beaming, warp tying and weaving, a graphene oxide/polypropylene multifilament is weaved into warps and weft yarns having a warp density of 45-55/5 cm, a weft density of 30-40/5 cm, a weight per square meter of 500-700 g/m$^2$ and a thickness of 0.06-0.20 mm;
    step II. preparation of a graphene oxide/polypropylene-based reinforced plain weave composite material: a heat-insulating material is made into several flat nets having different thicknesses and densities, and the heat-insulating material has a weight per square meter of 150-220 g/m$^2$ and a thickness of 0.10-0.25 mm; the graphene oxide/polypropylene-based woven plain weave fabric is placed on the heat-insulating material to prepare a non-woven net material by dry laying and needling reinforcement; the heat-insulating material is one or more of asbestos, rock wool, glass fiber, aluminum silicate fiber, high silica fiber and alumina fiber;
    step III. preparation of a graphene oxide/polypropylene-based reinforced plain weave composite material: through needling reinforcement, graphene oxide/polypropylene-based reinforced plain weave composite materials are reinforced by needling at front and back (twice) as the multilayer graphene oxide/polypropylene-based reinforced plain weave composite material, wherein the needling density is 90-130 needlings/cm$^2$, the needling frequency is 220-280 needlings/min, and the fiber net needling speed is 1.8-2.0 m/min;
    step IV. preparation of a resin composite material: the resin composite material is an epoxy resin: the epoxy resin and a first curing agent are weighed according to a mass ratio of 2:1, and preheated at 45-60° C. for 10 min, a silane coupling agent with a mass fraction of 3-5% of the epoxy resin and a graphene oxide/N-methylpyrrolidone dispersion (0.5%) with a mass fraction of 3-5% of the epoxy resin are added, and the mixture is stirred for 10 min and vacuumed at 45-60° C. for 30-40 min to remove bubbles in the epoxy resin; an accelerator with a mass fraction of 1-2% of the epoxy resin and acetone are sequentially added into the epoxy resin and stirred and mixed uniformly, the multilayer graphene oxide/polypropylene-based reinforced plain weave composite material is immersed therein, a second curing agent with a mass fraction of 40% of the epoxy resin is added, and the mixture is stirred uniformly and vacuumed at 45-60° C. for 30-40 min to remove bubbles; and the mixture is placed in a blast air oven at room temperature for 2 h, and cured at a temperature of 95° C.-120° C. for 4 h to finally obtain the graphene oxide/polypropylene heat-resistant high-strength composite profile.

2. The preparation method of the graphene oxide/polypropylene heat-resistant high-strength composite profile according to claim 1, characterized in that in step IV, either the first or second curing agent is one or more compound(s) selected from the group consisting of fatty amines, aromatics, aliphatic rings, modified amines, acid anhydrides, low-molecular polyamides and latent amine curing agents.

* * * * *